United States Patent [19]

Brentini

[11] 4,419,874
[45] Dec. 13, 1983

[54] FASTENER DEVICE

[76] Inventor: Attilio Brentini, c/o Lansa SA, 5, Ch. de la Gottrause, 1023 Crissier, Vaud, Switzerland

[21] Appl. No.: 173,298

[22] Filed: Jul. 29, 1980

[30] Foreign Application Priority Data

Aug. 10, 1979 [CH] Switzerland .......................... 7376/79

[51] Int. Cl.³ .............................................. A44B 15/00
[52] U.S. Cl. .................................. 70/459; 70/456 R; 24/238
[58] Field of Search ...................... 24/238, 239, 116 R, 24/230 A; 70/456 R, 459

[56] References Cited

U.S. PATENT DOCUMENTS

| 370,918 | 10/1887 | Armstrong | 24/238 |
| 1,027,041 | 5/1912 | Gammelgaard | 24/238 |
| 2,826,798 | 3/1958 | Kahl et al. | 24/238 |
| 3,537,154 | 11/1970 | Limage | 24/239 |
| 3,861,007 | 1/1975 | Silverman | 24/239 |
| 4,037,443 | 7/1977 | Motzer | 24/239 |

FOREIGN PATENT DOCUMENTS 1049040  8/1953  France .................................. 70/459

Primary Examiner—Robert A. Hafer
Attorney, Agent, or Firm—Ladas & Parry

[57] ABSTRACT

In order that it may be simple in use and of robust composition it has been constructed with a case (1) sliding round a coupling-piece (2) of which one end is connected to a small chain (6) and the other has a loop (3) which forms an opening (4) which in contact with the outside is in the open position or if not is in the closed position. In addition a leaf spring (8) is housed in the coupling-piece (2) and cooperates with a stud (9) which is integral with the case (1) in order to ensure by sliding of the case (1) and by elastic deformation of the leaf spring (8) the open or closed position.

3 Claims, 7 Drawing Figures

FASTENER DEVICE

The object of the present invention is a fastener device which can be employed either as a key-ring or clasp when it is miniaturized.

There exists on the market various fastener devices or clasps for necklaces or small chains.

A first of these known devices is composed of two portions, each attached to one end of the necklace, the one having a screw thread and the other the corresponding internal thread. In order to close the necklace it is often awkward to screw one piece into the other because of the small size of the clasp. Another of these devices has a toroidal shape and is composed of two circular portions. The first solid portion slides in the second hollow portion. A spring housed in the hollow portion systematically pushes back the solid portion into the closed position. A tiny handle is arranged on the solid portion. As soon as one acts against the force of the spring this solid portion is made to slide into the hollow portion and an opening is freed which enables the ends of the necklace to be threaded on. Then the handle is released and the ends are thus connected, the clasp acting after the style of one link in a chain. The hollow portion may be soldered directly onto one end of the necklace, and the opening will then enable the opposite end of the necklace to be threaded on. Such a fastener device is relatively delicate because by untoward handling it frequently happens that the solid portion slips out of the hollow portion.

On the other hand there exists quite a range of key-rings having fastener devices which vary greatly. One knows of the sliding hollow cylinder which frees an opening in a loop and then is screwed up in order to close this opening. The nuisance of such a device is that there is a risk of this cylinder, from handling the bunch of keys, becoming unscrewed little by little and finally opening at the wrong moment.

There likewise exists the composite ring of which one portion is raised, which enables the key to be carried round to the inside after having run right around the ring. It frequently happens that one breaks a fingernail or injures oneself at the time of raising this portion of the ring which enables the key to be introduced. Other keyrings have a fastener device with a stowage system which are likewise not very practical because as above they may cause breakage of a fingernail or slight injuries.

The aim of the present invention is to provide an improved fastener device simple in use and of robust construction, which avoids the aforesaid disadvantages and may be employed both as a clasp, when it is miniaturized, or as a key-ring.

Hence the object of the invention is the fastener device defined in claim 1.

The attached drawing illustrates embodiments of the invention, given by way of examples, and in it:

Figure 1:
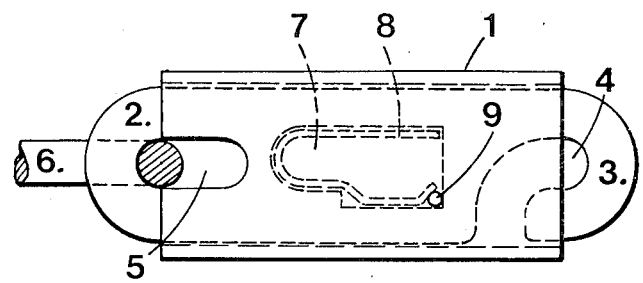
FIG. 1 shows enlarged a first embodiment of a clasp in the closed position.
Figure 3:
FIG. 3 shows an end view of this clasp.
Figure 2:
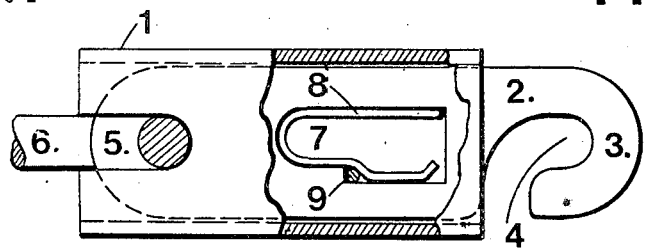
FIG. 2 shows the clasp of FIG. 1 in the open position.

FIGS. 1, 2 and 3 represent the fastener device which is the object of the invention. It is composed of a coupling-piece 2 round which can slide a case 1. The coupling-piece 2 has at one end an opening 5 into which is attached a necklace or a small chain 6, and at the other end a loop 3 forming an opening 4 which is in direct connection with the outside in the open position (FIG. 2) or is without connection with the outside in the closed position (FIG. 1). A seating 7 contains a leaf spring 8 held in this seating by the walls of the case 1. A pin 9 is integral with the case 1 and thus determines in cooperation with the shape of the leaf spring 8 the two extreme positions illustrated by the FIGS. 1 and 2. That is, by acting upon the case 1 the pin 9, thanks to the elasticity of the leaf spring 8, will be enabled to move from one position to the other, the case 1 thus freeing or reclosing the opening 4. The fastener device offers the advantage of guaranteeing solid fastening above all when one pulls at the same time on the ends 3 and 5 of the coupling-piece.

Figure 4:
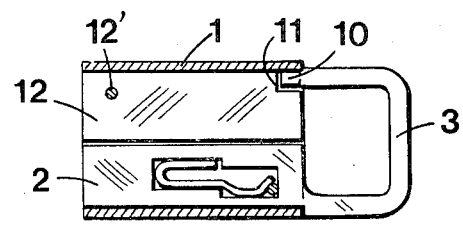
FIG. 4 shows a second embodiment of the fastener device representing a key-ring in the closed position.
Figure 5:
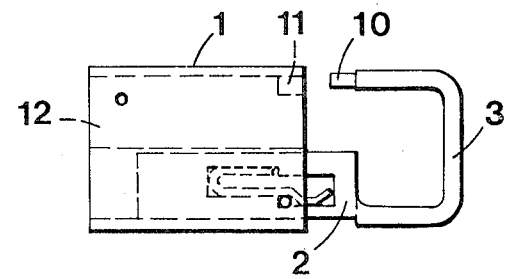
FIG. 5 shows the key-ring of FIG. 4 in the open position.

FIGS. 4 and 5 illustrate a fastener device arranged as a key-ring. The principle of closing and opening is the same as that described above. The loop 3 ends in a tip 10 which comes and seats in the opening 11 provided for this purpose in the case 1 and limited by the piece 12 which is likewise enclosed in this case 1, but fixed by a pin 12'.

Figure 6:
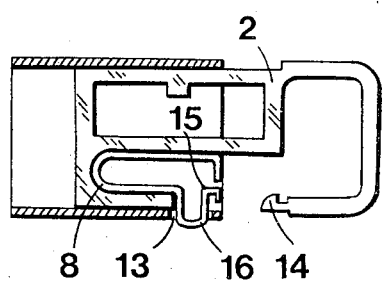
FIG. 6 shows a third embodiment of the fastener device.

In the embodiment of FIG. 6 the coupling-piece 2 is arranged so as to employ the whole of the room inside the case and the case 1 consequently does not include the limiting-piece 12. The leaf spring 8 is arranged differently. An opening 13 in the case 1 enables a loop 16 in the leaf spring 8 to spring out. The leaf spring 8 slides as one with the case 1. When the key-ring is reclosed by making the case 1 move towards the right, a hook 14 is forced into insertion in a loop 15 in the leaf spring 8 by elastic deformation of the latter. When it is desired to reopen the fastener device one bears upon the portion 16 of the leaf spring 8, which frees the hook 14 and enables the case 1 to be withdrawn towards the left into the open position.

Figure 7:
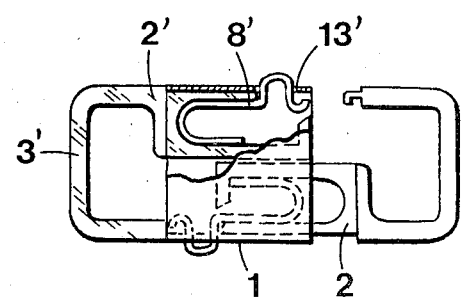
FIG. 7 shows an embodiment of the fastener device comprising two coupling-pieces.

FIG. 7 describes a fastener device in which two coupling-pieces 2 and 2' cooperate with only one case 1 in the way described in FIG. 6.

We may observe again that in the embodiments as FIGS. 6 and 7 the open position is not determined by a fixed position as is the case in the other embodiments. That is, the fastener device may be more-or-less open once the hook 14 has been freed from the loop 15 and in the fully open position the coupling piece 2 is not fixed.

The fastener device is not restricted to employment as a clasp or a key-ring.

I claim:

1. A key fastening-device comprising a case (1) and at least one coupling-piece (2) a portion of which is adapted to slide into said case (1), and the outer part of which is arranged to form a key fastening-loop (3), the device further comprising a plane spring (8) arranged in said case (1) for cooperating with the coupling-piece (2) which is also plane, said spring (8) being in the same plane as the coupling-piece (2) and forming a loop (16) passing through an opening (13) of the case (1) to form an operating button (16), said spring (8) presenting in addition a notch (15) for cooperating with a hook (14) provided on the coupling-piece (2) in order to ensure the closed position thereof, so that the operating of the said button (16) ensures the release of the hook (14) from the notch (15) and said spring (8) limits the opening sliding movement of the coupling-piece (2).

2. A device as in claim 1, characterized in that the leaf spring (8) is fixed with respect to the case (1) and in that the opening (4) in the coupling-piece (2) is larger than the leaf spring (8) in order to enable the said case (1) to slide from one of the positions, open or closed, into another.

3. A device as in claim 1, characterized in that it includes a second coupling-device (2') arranged in the case (1) so as to slide in parallel with the first (2), and comprising a loop (3') arranged at the end of the loop (3) opposite from the first coupling-device (2), a second leaf spring (8') housed in a second opening (7') in the second coupling-piece (2') and second means (13') integral with the case (1), which cooperate with the leaf spring (8') in order to ensure an open or closed position.

* * * * *